Jan. 7, 1964   E. D. CREESE   3,117,071
PLATING RACK
Filed Oct. 24, 1960   2 Sheets-Sheet 1
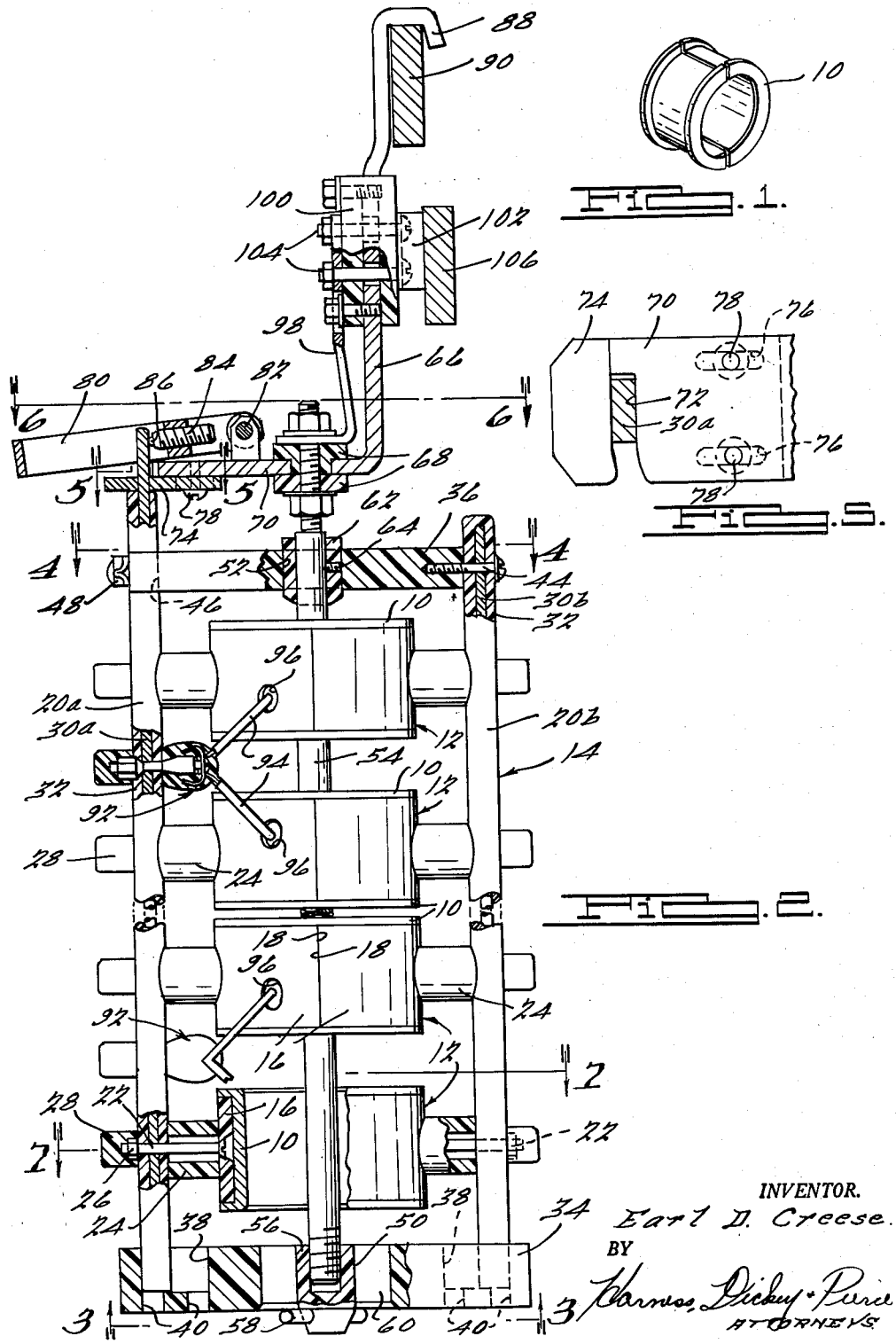
INVENTOR.
Earl D. Creese.
BY
Barnes, Dickey & Pierce
ATTORNEYS Jan. 7, 1964

E. D. CREESE 3,117,071

PLATING RACK

Filed Oct. 24, 1960

INVENTOR.
Earl D. Creese.
BY
Harness, Dickey & Pierce.
ATTORNEYS.

United States Patent Office 3,117,071
Patented Jan. 7, 1964

3,117,071
PLATING RACK
Earl D. Creese, Saint Johns, Mich., assignor to Federal-Mogul-Bower Bearings, Inc., Detroit, Mich., a corporation of Michigan
Filed Oct. 24, 1960, Ser. No. 64,591
4 Claims. (Cl. 204—272)

The present invention broadly relates to apparatus for electrotreating operations and more particularly, to a rack for holding a plurality of round flanged bearings or any similar cylindrical flanged articles, facilitating the electrochemical treatment of the inner circumferential surfaces and the outer annular flange surfaces thereof.

The workpiece treating rack comprising the present invention is applicable for processing a variety of cylindrical flanged articles or segmented cylindrical flanged articles through a variety of treating steps including electrochemical processing steps such as electroplating, electrocleaning, electropolishing, and the like. One specific use of the treating rack as herein shown and described is for electroplating full round flanged bearings and assembled semicylindrical flanged bearings of the general type used in internal combustion engines and the like. It is common practice in the manufacture of sleeve-type precision bearings which are generally of a composite structure comprising a hard metal backing member such as steel, for example, having a bearing lining on one surface thereof such as a copper-lead alloy or aluminum alloy, for example, to improve the surface of the bearing lining by applying a bearing alloy "over-plate" thereon. In such practice the unlined surfaces of the hard metal backing member are usually masked or otherwise shielded so as to be essentially free of the bearing alloy over-plate material. It is also important that the thickness of the over-plate applied to the surface of the bearing lining is substantially uniform which obviates the necessity for any subsequent machining operations.

A number of plating apparatuses have been heretofore proposed which are adapted for applying an over-plate to the bearing surface of conventional straight or unflanged sleeve half-bearings. This has been achieved, for example, by stacking a column of half-bearings inside a box rack of the type disclosed in U.S. Patent No. 2,697,690 and assigned to the same assignee as the present invention. Another method proposed has been to stack two columns of half-bearings together forming therewith a full round column disposed around an internal anode. The stacked relationship of the straight bearings serves to shield the rearward surfaces thereof minimizing electrodeposition of a bearing alloy on the backing member. However, the foregoing apparatus and techniques are unsatisfactory for providing a bearing alloy over-plate on the internal circumferential surfaces and the annular side surfaces of full round flanged bearings and the like. The necessity of exposing the annular side surfaces of the flanges on the flanged cylindrical bearings prevents stacking of the workpieces and has rendered conventional work racks heretofore known cumbersome, inefficient, and ineffective for providing a uniform over-plate on the outer side surfaces of the flanges and the inner circumferential surfaces of flanged bearings.

Accordingly, it is a primary object of the present invention to provide a work rack which enables more efficient and more effective electrochemical treatment of the outside flange surfaces and inner circumferential surfaces of flanged cylindrical articles than has been possible in work racks heretofore known.

Another object of the present invention is to provide a high capacity work rack which is of compact and simple design, economical manufacture and which enables quick and simple loading and unloading of the workpieces to be treated.

Still another object of the present invention is to provide an improved work rack incorporating mounting means thereon which mask the exposed surfaces of the backing member preventing treatment thereof thereby obviating the heretofore time consuming and costly practice of manually masking the surfaces not to be treated such as by applying a protective coating thereover, for example.

A further object of the present invention is to provide a high capacity, light weight work rack of an open construction which decreases dragout, minimizes cascading of the treating solutions against the surfaces of the treated workpieces during the withdrawal of the work rack from a treating solution, and provides for more rapid and efficient rinsing of the workpieces thereon.

A still further object of the present invention is to provide an improved work rack of a simple and light weight construction which substantially eliminates adverse galvanic current effects generally found in other racks providing for substantially uniform plate distribution and tenacious adhesion to the inner circumferential surface and annular outer flanged surfaces of flanged cylindrical workpieces.

Other objects and advantages of the present invention will become apparent from the following detailed description taken in conjunction with the accompanying drawings, wherein:

FIGURE 1 is perspective view of a pair of semicylindrical flanged workpieces such as a pair of flanged half-bearings to which the treating rack of the present invention is applicable;

FIG. 2 is a side elevation view partly in section of a treating rack incorporating therein the preferred embodiments of this invention;

FIG. 5 is a transverse sectional view of the conductor bar or electrode engaging means of the rack shown in FIG. 2 and taken along the line 5—5 thereof;

Figure 3:
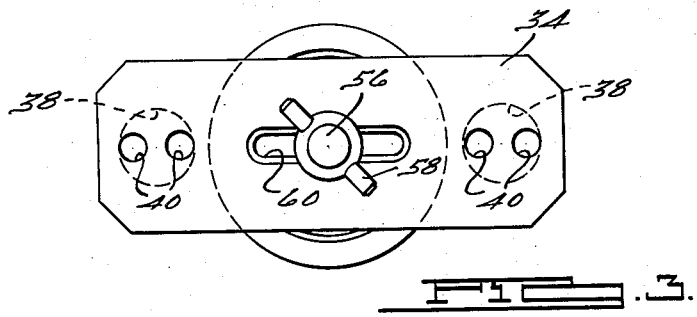
FIG. 3 is a bottom plan view of the treating rack shown in FIG. 2.
Figure 4:
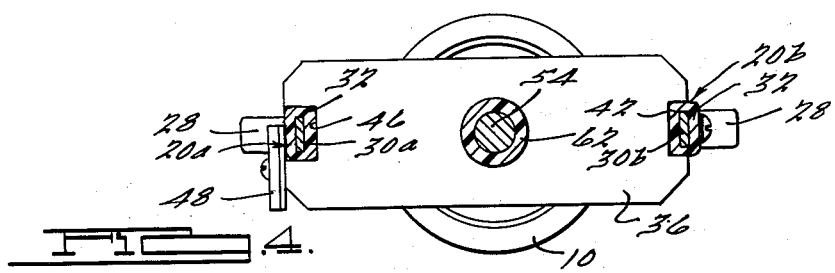
FIG. 4 is a transverse sectional view of the treating rack shown in FIG. 2 and taken along the line 4—4 thereof.
Figure 6:
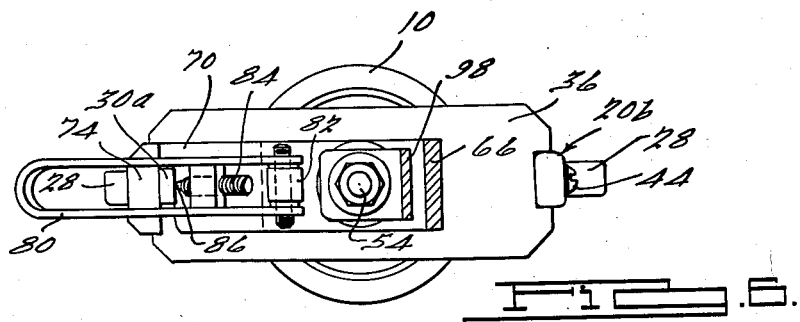
FIG. 6 is a transverse vertical sectional view of the treating rack shown in FIG. 2 and taken along the line 6—6 thereof and showing in particular the latching mechanism for removably securing the conductor bar to the frame.
Figure 7:
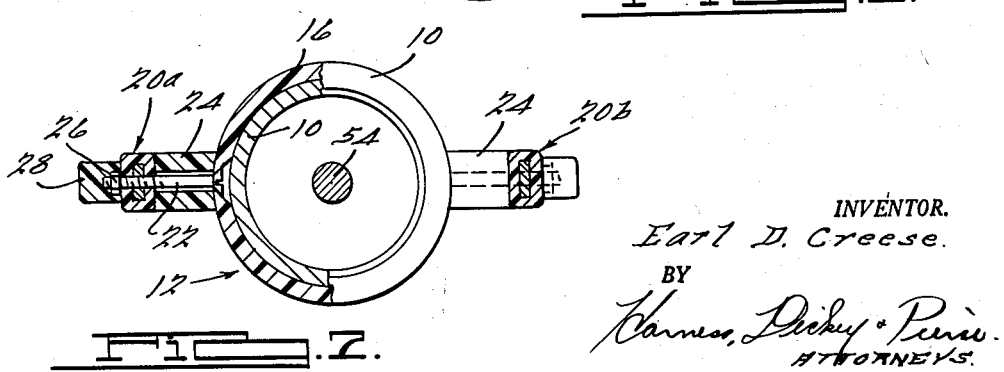
FIG. 7 is a transverse vertical sectional view through a cylindrical shield of the treating rack shown in FIG. 2 and taken substantially along the line 7—7 thereof.

Referring now in detail to the drawings and as may best be seen in FIGURE 1, a flanged bearing 10 comprising a pair of flanged semicylindrical half-bearings or other similar integral or segmented flanged cylindrical articles can readily be treated along the inner circumferential surface and outer annular flange surfaces by virtue of the novel construction of the treating rack comprising the present invention. The treating rack as shown in FIG. 2 comprises a series of cylindrical shields 12 which are supported by a frame generally indicated at 14 in substantially equally spaced axial alignment. Each of the cylindrical shields 12 comprise a pair of semicircular members or saddles 16 of a nonconductive material which are disposed with the parting edge surfaces 18 thereof in opposing abutting relationship. Any one of a number of nonconductive materials well known in the art can be employed for the saddles 16 which are resistant to the acidic and alkaline treating solutions in which the rack is immersed. For example, polymethyl methacrylate, polyvinyl chloride and phenolic resins are satisfactory for this purpose. The saddles 16 are of a width corresponding substantially to the distance between the inner surfaces of the flanges of the flanged bearing 10 and are adapted to snugly overlie the outer circumferential surface thereof masking it from the treating solution during the treating operation. Additionally, each of the saddles 16 is of a thickness sufficient to mask the inner side surfaces of the flanges of the bearings 10.

The frame 14 comprises a pair of elongated side members 20a, 20b to which the corresponding saddles 16 of each cylindrical shield 12 are rigidly secured by means of a screw fastener 22 extending axially through a tubular spacer 24. The heads of the screw fasteners 22 are countersunk beneath the inner surface of the saddles 16 and the nuts 26 disposed in threaded engagement on the shanks thereof are encased in a suitable nonconductive sealing cap 28. Each of the side members 20a, 20b comprises a hard metal core 30a, 30b, providing structural strength and rigidity to the frame and having a nonconductive sealing coating 32 applied over the surfaces thereof. The insulated coating 32 concurrently shields the metal cores 30a, 30b from attack of any corrosive liquids in which the rack is immersed and additionally, electrically insulates the metal cores from the treating solution. The insulated coating 32 can comprise any one of a number of materials well known in the art including vinyl resins and fluorinated polymeric hydrocarbons, for example.

The side members 20a, 20b are removably clamped together wherein the edge surfaces 18 of the saddles 16 are maintained in abutting relationship by a pair of end members including a base member 34 and a top member 36. The lower ends of the side members 20a, 20b as viewed in FIGURE 2 are releasably engaged in engaging bores 38 in the base member 34 each of which is provided with a pair of drainage apertures 40 enabling drainage of the treating solution from the engaging bores 38 during the withdrawal of the treating rack from a treating solution. The upper end of the side member 20b is disposed in a complementary shaped groove or notch 42 in the side edge surface of the top member 36 and is rigidly secured therein by means of a screw 44. The upper end of the side member 20a is guidably disposed in a groove 46 in the other side edge surface of the top member 36 and is removably secured therein by means of a turn button 48 rotatably mounted on the top member 36.

The base member 34 is provided with a guide bore 50 disposed at substantially the midpoint thereof and in axial alignment with the longitudinal axis of the cylindrical shields 12. Similarly, the top member 36 is provided with a guide bore 52 disposed in axial alignment with the longitudinal axis of the cylindrical shields 12. The guide bore 50 and the guide bore 52 are adapted to slidably receive a cylindrical conductor bar or electrode 54 extending axially through the cylindrical shields 12. The lower end of the conductor bar 54 is provided with a nonconductive sleeve 56 threadably engaged thereon and adapted to be slidably disposed in the guide bore 50 as shown in FIG. 2. The lower projecting end portion of the sleeve 56 is provided with a transverse engaging pin 58 which is adapted to overlie the lower surface of the base member 34 for maintaining the base member in abutting contact with the lower ends of the side members 20a, 20b and for supporting the weight of the rack. The guide bore 50 in the base member 34 is also provided with a transverse slot 60 enabling passage of the projecting end portions of the engaging pin 58 therethrough. The guide bore 52 in the top member 36 can similarly be provided with a transverse slot (not shown) enabling complete removal of the conductor bar from the frame.

The upper end portion of the conductor bar 54 is provided with a nonconductive bushing 62 which is adapted to be slidably disposed in the guide bore 52 of the top member 36. The bushing 62 is longitudinally adjustable on the conductor bar 54 and is retained in the appropriate adjusted position thereon by means of a suitable set screw 64. Longitudinal adjustment of the bushing 62 on the conductor bar 54 enables adjustment of the exposed surface of the conductor bar 54 adjacent to the upper cylindrical shield 12 to provide the appropriate current density and enabling the desired degree of treatment of the flanged cylindrical article adjacent thereto.

The work rack is suspended from an L-shaped hanger bracket 66 rigidly affixed to the upper projecting end portion of the conductor bar 54 and insulated therefrom by means of insulating washers 68. The end of a horizontal leg portion 70 of the hanger bracket 66 is provided with a stepped notch 72 and a jaw plate 74 adjustably mounted thereon which are adapted to slidably receive and engage the exposed projecting end portion of the hard metal core 30a of the side member 20a as may be best seen in FIG. 5. The jaw plate 74 is provided with a pair of longitudinal slots 76 through which the shanks of adjusting screws 78 extend enabling longitudinal adjustment of the jaw plate relative to the stepped notch 72 on the horizontal leg portion 70. To prevent inadvertent disengagement of the hard metal core 30a, from the jaw plate 74 and stepped notch 72, a suitable latching mechanism is provided and comprises a lever 80 pivotally mounted on a hinge member 82 secured to the horizontal leg portion 70 of the hanger bracket. The lever 80 is provided with an adjustable retainer 84 incorporating a resiliently biased plunger 86 therein. The projecting end portion of the plunger 86 is adapted to frictionally engage the inner surface of the exposed projecting hard metal core 30a when in the latched position as shown in FIG. 2. When the latching mechanism is in the engaged position rotation of the conductor bar 54 relative to the frame of the rack is prevented whereby the engaging pin 58 at the lower end of the conductor bar 54 is maintained in locking relationship with respect to the base member 34.

The upper end portion of the hanger bracket 66 is provided with an engaging hook portion 88 which is adapted to overlie and slidably engage a suitable supporting rail 90 disposed above the treating stations. The supporting rail 90 is conventionally connected to a suitable lift mechanism for moving the rail to and from a raised position wherein the work rack is suspended above the treating station to a lowered position wherein the work rack is immersed in a treating solution to a depth corresponding to about the level of the top member 36. At treating stations wherein an electrochemical operation is to be performed, the supporting rail 90 is electrified by any one of a number of means well known in the art and whereby the electrical current is conducted through the hanger bracket 66 to the hard metal core 30a of the side member 20a. Transmission of the electrical current from the core 30a to the flanged cylindrical workpieces 10 in the cylindrical shields 12 is achieved by a series of conductor tips 92 mounted at longitudinally spaced intervals along the side member 20a and disposed in electrical contact with the core 30a. Each of the conductor tips 92 is enclosed in an insulated coating of a type similar to that on the side members and is provided with a pair of leads 94 extending through an aperture 96 in each of the cylindrical shields 12 and disposed in electrical contact with the workpieces. When the workpieces comprise a pair of semicylindrical flanged articles such as flanged half-bearings, it is preferred that two leads 94 are used for each cylindrical shield for contacting each of the semicylindrical flanged workpieces.

Energization of the conductor bar 54 is achieved through a conductor strap or lead 98 secured to the upper end portion of the conductor bar and mounted on an insulating block 100 secured to the upstanding portion of the hanger bracket 66. A suitable wiper contact 102 is affixed to the opposing face of the insulator block 100 and is electrically connected to the conductor lead 98 by means of retainer screws 104. The wiper contact 102 is adapted to slidably contact a suitable bus bar 106 disposed adjacent to the treating stations at which an electro-chemical treating process is to be performed on the workpieces. When a plating operation is to be performed, such as an over-plate on the inner circumferential surfaces and the outer annular surfaces of the flanges of full round flanged bearings, the supporting rail 90 is negatively charged whereby the workpieces become the cathode and the bus bar is positively charged whereby the conductor bar 54 becomes the anode. By virtue of the substantially equal spacing of the cylindrical shields 12 and the concentricity of the conductor bar 54, substantially equal current densities exist along the exposed surfaces of the bearing whereby a substantially uniform and tenacious coating of a bearing metal is applied.

As will be noted in FIGURE 2 the hook portion 88 is laterally offset from the longitudinally axis of the plating rack whereby when the rack is freely suspended from the supporting rail, the longitudinal axis of the cylindrical shields 12 is angularly offset from the vertical. An angular offset in the order of about five degrees facilitates drainage and minimizes dragout during the withdrawal of the rack from a treating solution. Decreased dragout and quick drainage of the work rack are also enhanced by virtue of the open construction of the rack and the absence of horizontal surfaces or other points of liquid entrapment. The low dragout characteristics of the work rack substantially reduce waste of expensive chemicals and furthermore reduce contamination of succeeding treating solutions. In addition, the rapid draining characteristics enable higher transfer rates between treating stations enabling higher production capacities and more efficient use of the equipment.

The angularity of the rack during withdrawal from a liquid treating receptacle also reduces cascading of the draining treating solution across the surfaces of the workpieces which heretofore has adversely affected the quality of the treated surface and has contributed toward poor adhesion of the over-plate. The quality and tenacious bonding of the over-plate to the substrate has also been enhanced by virtue of the open construction of the plating rack providing for more efficient and more complete rinsing of the workpieces. In addition to the foregoing advantages, the ease of loading and unloading the work rack coupled with its light weight and ease of handling constitute still further advantages.

As heretofore stated the rack when in a freely suspended condition is disposed with the longitudinal axis of the cylindrical shields 12 angularly disposed from the vertical. During an electroplating operation, for example, the longitudinal axis of the cylindrical shields 12 is disposed in a substantially vertical position as a result of the coaction between the wiper contact 102 and the bus bar 106. This position is illustrated in FIG. 2 wherein the bus bar 106 is in abutting relationship with the wiper contact 102 preventing swinging movement of the work rack to an inclined position. To accomplish this, the bus bar 106 may alternatively be provided with a series of cammed surfaces adapted to cam the rack to a vertical position during longitudinal transfer thereof along the supporting rail 90, or the bus bar 106 can be laterally movable to and from a retracted position out of contact with the wiper contact to a projected position as shown in FIG. 2 wherein it is disposed in electrical contact with the wiper contact 102 and concurrently maintains the rack in a vertical position.

The quick and simple loading and unloading of flanged cylindrical and pairs of semicylindrical workpieces in the rack is achieved with the rack removed from the supporting rail and with the side member 20b disposed in a horizontal position and maintained in that position by a suitable jig or fixture. With the rack disassembled, the base member 34 and the side member 20a and the saddles 16 thereon are removed, and the conductor bar 54 is withdrawn to a point wherein the engaging pin 58 is disposed adjacent to the top member 36 or is completely removed from the rack by withdrawing the engaging pin through the bore 52 when provided with a transverse slot. In that position, the flanged cylindrical or pairs of semicylindrical workpieces are inserted in the saddles connected to the side member 20b. When semicylindrical flanged articles are loaded, the parting edge surfaces of the pairs of semicylindrical workpieces are preferably disposed about 90° from the parting edge surfaces 18 of the saddles 16 which facilitates alignment of the workpieces and also enhances the rigidity of the loaded assembled rack. The side member 20a with the saddles 16 thereon is then placed in overlying relationship above the flanged cylindrical workpieces and in which position the parting edge surfaces 18 of the mating saddles are disposed in abutting relationship. The end portion of the side member 20a is removably secured in the groove 46 of the top member 36 by rotating the turn button 48 ninety degrees and into overlying engaging relationship.

The base member 34 is then installed with the ends of the side members 20a, 20b disposed in sliding engagement in the engaging bores 38. The conductor bar or electrode 54 is then extended through the cylindrical shields 12 and the sleeve 56 having the engaging pin 58 thereon is extended through the guide bore 50 and transverse slot 60 in the base member 34. The conductor bar 54 is then rotated whereby the engaging pin is indexed out of alignment with the transverse slot 60 and in overlying relationship with the lower surface of the base member 34. Simultaneously the stepped notch 72 in the horizontal leg portion 70 and the jaw plate 74 are rotated into engaging relationship with the exposed end of the hard metal core 30a of the side member 20a and the lever 80 is rotated downwardly into a latching position wherein the plunger 86 frictionally contacts the surface of the hard metal core 30a.

The loaded work rack assembled in accordance with the procedure set forth above, can then be loaded on a suitable conveying machine or supporting rail whereby the cylindrical flanged workpieces are subjected to a prescribed treating sequence, such as for example, an electroplating operation. At the completion of the electroplating operation the work rack is simply removed from the treating apparatus and is disassembled by reversing the steps hereinabove described in connection with the loading of the rack.

It will be understood by those skilled in the art that while the conductor bar or electrode 54 is shown in the drawings as having a uniform cylindrical configuration, the configuration thereof can be varied in accordance with the nature of the treating process and the specific type and configuration of the flanged cylindrical workpieces to achieve the best results. For example, an electrode can be provided having a stepped diameter along its length thereby subjecting the exposed surfaces of the workpieces to the optimum current density.

While it will be apparent that the preferred embodiments herein illustrated are well calculated to fulfil the objects above stated, it will be appreciated that the invention is susceptible to modification, variation, and change without departing from the proper scope of fair meaning of the subjoined claims.

What is claimed is:

1. In a rack for treating the inner circumferential surface and outer annular flange surfaces of segmented and integral cylindrical flanged articles, the combination comprising a plurality of cylindrical shields disposed in substantially equally spaced axial alignment and having a width corresponding substantially to the distance between the inner annular flange surface of the flanged cylindrical articles to be treated, each of said cylindrical shields comprising a pair of semicircular members having the parting edge surfaces thereof adapted to be disposed in abutting alignment for clamping a flanged cylindrical article in said cylindrical shield, a supporting frame rigidly supporting and removably clamping each of said pair of semicircular members together, conductor means for electrically connecting the articles in said cylindrical shields to a current source, an electrode removably disposed on said frame and extending along substantially the longitudinal axis of said cylindrical shields, latching means for removably securing said electrode in weight supporting relationship to said frame, means electrically connecting said electrode to a current source opposite to that of said articles, and hook means on said electrode for suspending said rack at a treating station.

2. In a rack for treating the inner circumferential surface and outer annular flange surfaces of segmented and integral cylindrical flanged articles, the combination comprising a plurality of cylindrical shields disposed in substantially equally spaced axial alignment and having a width corresponding substantially to the distance between the inner annular flange surfaces of the flanged cylindrical articles to be treated, each of said cylindrical shields comprising a pair of semicircular members having the parting edge surfaces thereof adapted to be disposed in abutting alignment for clamping a flanged cylindrical article in said cylindrical shield, a supporting frame rigidly supporting and removably clamping each of said pair of semicircular members together, conductor means for electrically connecting the articles in said cylindrical shields to a current source, an electrode removably disposed on said frame and extending along substantially the longitudinal axis of said cylindrical shields, latching means for removably securing said electrode to said frame, means electrically connecting said electrode to a current source opposite to that of said articles, and hook means for suspending said rack with the longitudinal axis through said cylindrical shields angularly disposed from the vertical at a treating station, and means on said rack adapted to coact with means at a treating station maintaining said longitudinal axis in a substantially vertical position during treatment.

3. In a rack for treating the inner circumferential surface and outer annular flange surfaces of segmented and integral cylindrical flanged articles, the combination comprising a plurality of cylindrical shields disposed in substantially equally spaced axial alignment and having a width corresponding substantially to the distance between the inner annular flange surfaces of the flanged cylindrical articles to be treated, each of said cylindrical shields comprising a pair of semicircular members having the parting edge surfaces thereof adapted to be disposed in abutting alignment for clamping a flanged cylindrical article in said cylindrical shield, a supporting frame comprising a pair of elongated side members supporting mating ones of each of the pairs of said semicircular members, and end members coacting with said side members removably securing said side members together and clamping the parting edge surfaces of said semicircular members in abutting relationship, each of said end members having a bore therethrough disposed in axial alignment with the longitudinal axis of said cylindrical shields, an electrode removably disposed in said bore of each of said end members and extending along substantially the longitudinal axis of said cylindrical shields, latching means for removably securing said electrode to said frame, hook means on said electrode for suspending said rack at a treating station, first conductor means associated with said hook means for electrically connecting the articles in said cylindrical shields to a current source, and second conductor means associated with said hook means for electrically connecting said electrode to a current source opposite to that of said articles.

4. In a rack for plating the inner circumferential surface and outer annular flange surfaces of full round and pairs of semicylindrical flanged bearings, the combination comprising a plurality of nonconductive cylindrical shields disposed in substantially equally spaced axial alignment and having a width corresponding substantially to the distance between the inner annular flange surfaces of the bearings, each of said cylindrical shields comprising a pair of semicircular members having the parting edge surfaces thereof adapted to be disposed in abutting alignment for clamping a flanged bearing in said cylindrical shield, a supporting frame including a pair of elongated side members supporting mating ones of each of the pairs of said semicircular members, and end members coacting with said side members removably securing said side members together and clamping said parting edge surfaces of said semicircular members in abutting relationship, one of said side members having conductor means thereon for providing electrical connection to the bearings, each of said end members having a bore therethrough disposed in axial alignment with the longitudinal axis of said cylindrical shields, an anode bar removably disposed in said bore of each of said end members and extending along substantially the longitudinal axis of said cylindrical shields, latching means removably securing said anode bar to said frame, hook means on said anode bar for suspending said rack at a plating station, first conductor means associated with said hook means for electrically connecting said one of said side members to a cathode current source, and second conductor means for electrically connecting said anode bar to an anode current source.

References Cited in the file of this patent

UNITED STATES PATENTS

| 2,323,952 | Wick | July 13, 1943 |
| 2,401,415 | Duggan | June 4, 1946 |
| 2,484,068 | Booe | Oct. 11, 1949 |

FOREIGN PATENTS

| 553,363 | Great Britain | May 18, 1943 |